No. 697,416. Patented Apr. 8, 1902.
W. S. SUTHERLAND.
NUT LOCK.
(Application filed Nov. 23, 1901.)
(No Model.)

W. S. Sutherland, Inventor,

Witnesses
Howard D. Orr.
B. G. Foster.

By E. G. Siggers
Attorney

UNITED STATES PATENT OFFICE.

WILLIAM S. SUTHERLAND, OF CHELSEA, INDIAN TERRITORY, ASSIGNOR OF ONE-HALF TO DAVID G. ELLIOTT, OF CHELSEA, INDIAN TERRITORY.

NUT-LOCK.

SPECIFICATION forming part of Letters Patent No. 697,416, dated April 8, 1902.

Application filed November 23, 1901. Serial No. 83,441. (No model.)

*To all whom it may concern:*

Be it known that I, WILLIAM S. SUTHERLAND, a citizen of the United States, residing at Chelsea, Cherokee Nation, Indian Territory, have invented a new and useful Nut-Lock, of which the following is a specification.

The present invention relates to nut-locks; and the object thereof is to provide a simple article of this character which will securely hold a nut against turning on the bolt and is itself held against accidental displacement, said lock being so constructed that it may be removed and replaced without injury to the bolt, the nut, or itself.

The invention is fully described in the following specification, and clearly illustrated in the accompanying drawings, wherein—

Figure 1:
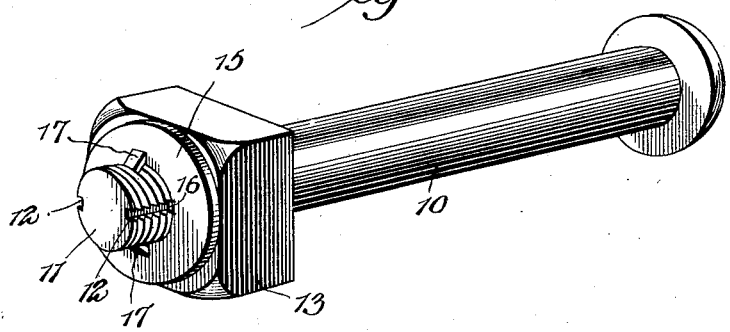
Figure 2:
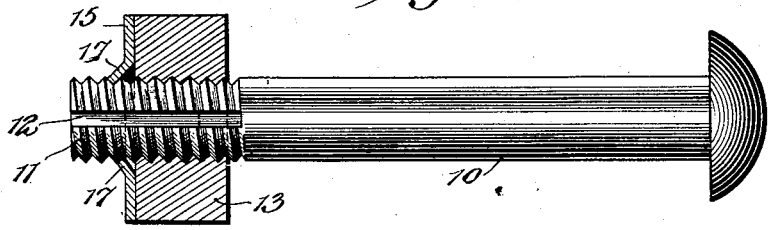
Figure 3:
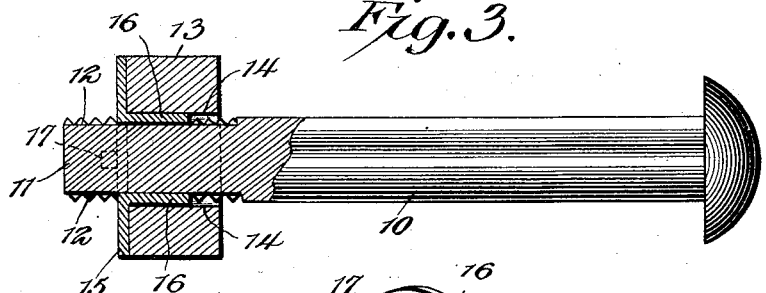
Figure 4:
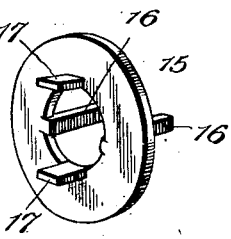

Figure 1 is a perspective view showing the improved lock applied to a bolt and nut. Fig. 2 is a longitudinal sectional view through the same. Fig. 3 is also a longitudinal sectional view at right angles to that shown in Fig. 2. Fig. 4 is a perspective view of the lock when detached.

Similar numerals of reference designate corresponding parts in all the figures of the drawings.

The bolt, which is designated at 10, is of the ordinary construction, except that the threaded portion 11 is provided on its opposite sides with longitudinal grooves 12, that are preferably arranged diametrically opposite to each other. The nut 13 has the usual bolt-receiving opening, and the walls of said opening are provided with slots 14, these slots being also disposed in diametrically opposite relation and being arranged to aline with the slots 12 of the bolt.

The lock is in the form of a washer 15, that is placed over the projecting end of the bolt when the nut has been threaded thereon, and said washer has a pair of locking-stems 16, that project from the edge of the bolt-receiving opening and are arranged to engage in the alined slots 12 and 14, as is clearly shown in Fig. 2. As a result the nut 13 will be held against relative movement upon the bolt 10. In order to prevent the longitudinal displacement of the washer 15 and the consequent unlocking of the nut, said washer is provided with bendable holding-lugs 17, that are arranged at diametrically opposite points on the edge of the bolt-receiving opening between the locking-stems 16, these lugs projecting from the side of the washer opposite said locking-stems. When the washer has been placed in operative position upon the nut 13, the holding-lugs 17 are bent inwardly to engage in the spaces between adjacent threads of the bolt, thereby holding the washer against longitudinal movement upon said bolt and maintaining the locking-stems in operative relation. To remove the lock, it is only necessary to bend the lugs 17 outwardly until they are disengaged from the threads, whereupon the washer 15 and the locking-stems carried thereby can be readily removed, so that the nut can be rotated and again locked. By this construction it will be seen that a simple device is provided which not only holds the nut and bolt against relative movement, but is itself securely locked. Furthermore, it may be readily removed and replaced without injury to itself or the elements secured thereby.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. The combination with a bolt and nut, of a lock comprising a washer, a locking device that projects from the washer and engages both the nut and bolt to hold them against relative movement, and a holding device that engages the bolt to hold said washer against longitudinal displacement.

2. The combination with a bolt and nut, of a lock comprising a washer, a locking device projecting from one side of the washer, said locking device engaging both the nut and bolt to hold them against relative movement, and a holding device projecting from the side of the washer opposite the locking device and engaging the bolt to hold said washer against longitudinal displacement.

3. The combination with a bolt and nut, having slots adapted to be placed in alinement, of a lock comprising a washer having a locking-stem that engages in the alined slots of the nut and bolt to hold them against relative movement, and a holding device carried by the washer and engaging the bolt to hold it against longitudinal displacement upon said bolt.

4. The combination with a bolt and nut having slots adapted to be placed in alinement, of a lock comprising a washer having a locking-stem that engages in the alined slots of the nut and bolt to hold them against relative movement, and a bendable holding-stud carried by the washer and arranged to engage the threads of the bolt to hold said washer against longitudinal displacement.

5. The combination with a bolt and nut having slots in their opposite faces, the slots of said nut being adapted to aline with the corresponding slots of the bolt, of a lock comprising a washer having a pair of oppositely-disposed locking-stems that engage in the alined slots of the nut and bolt to hold them against relative movement, and a pair of oppositely-disposed holding-lugs carried by the washer and projecting from the side opposite the locking-stems, said holding-lugs engaging the bolt-threads to hold the washer against longitudinal displacement.

In testimony that I claim the foregoing as my own I have hereto affixed my signature in the presence of two witnesses.

WILLIAM S. SUTHERLAND.

Witnesses:
JOHN D. SCOTT,
CHAS. WINDHAM.